United States Patent
Filsfils et al.

(10) Patent No.: US 11,736,397 B2
(45) Date of Patent: *Aug. 22, 2023

(54) PACKET TRACING MECHANISM IN A NETWORK LEVERAGING SRV6

(71) Applicant: Cisco Technology, Inc., San Jose, CA (US)

(72) Inventors: Clarence Filsfils, Brussels (BE); Pablo Camarillo Garvia, Madrid (ES)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,532

(22) Filed: Oct. 1, 2021

(65) Prior Publication Data
US 2022/0029916 A1 Jan. 27, 2022

Related U.S. Application Data

(63) Continuation of application No. 16/684,006, filed on Nov. 14, 2019, now Pat. No. 11,165,699.

(51) Int. Cl.
*H04L 45/74* (2022.01)
*H04L 43/106* (2022.01)
*H04L 45/02* (2022.01)
*H04L 69/22* (2022.01)

(52) U.S. Cl.
CPC ............ *H04L 45/74* (2013.01); *H04L 43/106* (2013.01); *H04L 45/02* (2013.01); *H04L 69/22* (2013.01)

(58) Field of Classification Search
None
See application file for complete search history.

(56) References Cited

U.S. PATENT DOCUMENTS

| 7,957,295 B2 * | 6/2011 | Varma .................. H04L 43/106 370/231 |
| 10,230,605 B1 | 3/2019 | Filsfils et al. |
| 10,284,460 B1 | 5/2019 | Bshara et al. |

(Continued)

FOREIGN PATENT DOCUMENTS

WO 2019128950 7/2019

OTHER PUBLICATIONS

International Search Report and Written Opinion from the International Searching Authority, dated Feb. 9, 2021, 15 pages, for corresponding International Patent Application No. PCT/US2020/059206.

(Continued)

*Primary Examiner* — Xavier S Wong
(74) *Attorney, Agent, or Firm* — Polsinelli

(57) ABSTRACT

The present disclosure provides a packet tracing mechanism will be described that provides packet tracing information to a mobile network controller. In one aspect, a method includes receiving a data packet sent from a source node to a destination node; determining if the data packet is to be updated with packet tracing information; and upon determining that the data packet is to be updated, updating the packet tracing information of the data packet to include identification of the network device and an ingress timestamp of the data packet at the network device for a corresponding network controller to determining network routing policies.

20 Claims, 9 Drawing Sheets

(56) References Cited

U.S. PATENT DOCUMENTS

| | | | |
|---|---|---|---|
| 10,361,969 | B2 | 7/2019 | Bosch et al. |
| 11,165,699 | B2* | 11/2021 | Filsfils .................... H04L 45/74 |
| 2002/0157041 | A1* | 10/2002 | Bennett ................. H04L 69/329 |
| | | | 714/43 |
| 2003/0043427 | A1 | 3/2003 | Robidas et al. |
| 2017/0064343 | A1 | 3/2017 | Tsukagoshi |
| 2017/0180235 | A1 | 6/2017 | Zak et al. |
| 2018/0026884 | A1 | 1/2018 | Nainar et al. |
| 2018/0248797 | A1* | 8/2018 | Kim ........................ H04L 12/42 |
| 2018/0278548 | A1 | 9/2018 | Pignataro et al. |
| 2018/0331890 | A1 | 11/2018 | Song et al. |
| 2018/0375766 | A1 | 12/2018 | Filsfils et al. |
| 2019/0268267 | A1* | 8/2019 | Pignataro .............. H04L 45/741 |
| 2020/0084147 | A1* | 3/2020 | Gandhi ................... H04L 45/50 |
| 2020/0229042 | A1* | 7/2020 | Srivastava ............ H04W 40/02 |

OTHER PUBLICATIONS

Brockners, F., et al., "Encapsulations for In-situ OAM Data," draft-brockners-inband-oam-transport-05, Jul. 2, 2017, 30 pages.
Brockners, F., et al., "Data Fields for In-situ OAM," draft-ietf-ippm-ioam-data-08, Oct. 24, 2019, pp. 1-40.
Xhonneux et al., "An Interface For Programmable IPV6 Segment Routing Network Functions in Linux," DIAL.mem, 2018, pp. 1-87.

\* cited by examiner

PACKET TRACING MECHANISM IN A NETWORK LEVERAGING SRV6

CROSS-REFERENCE TO RELATED APPLICATION

This application is a continuation of U.S. Non-Provisional patent application Ser. No. 16/684,006, filed on Nov. 14, 2019, the full disclosure of which is hereby expressly incorporated by reference in its entirety.

TECHNICAL FIELD

The subject matter of this disclosure relates in general to the field of computer networking, and more particularly, to systems and methods for tracing and monitoring data packets as they traverse through a network to optimize network performance.

BACKGROUND

Segment Routing Over IPv6 (SRv6) has been proposed to replace GPRS Transport Protocol for carrying user data (GTP-U). SRv6 requires mobile and network operators to implement a network monitoring mechanism for purposes of applying network routing policies such as Ultra-Reliable Low-Latency Communication (URLLC). However, currently no SRv6 compatible network monitoring mechanism exists for tracking data packets as they traverse a network from a source to a destination.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
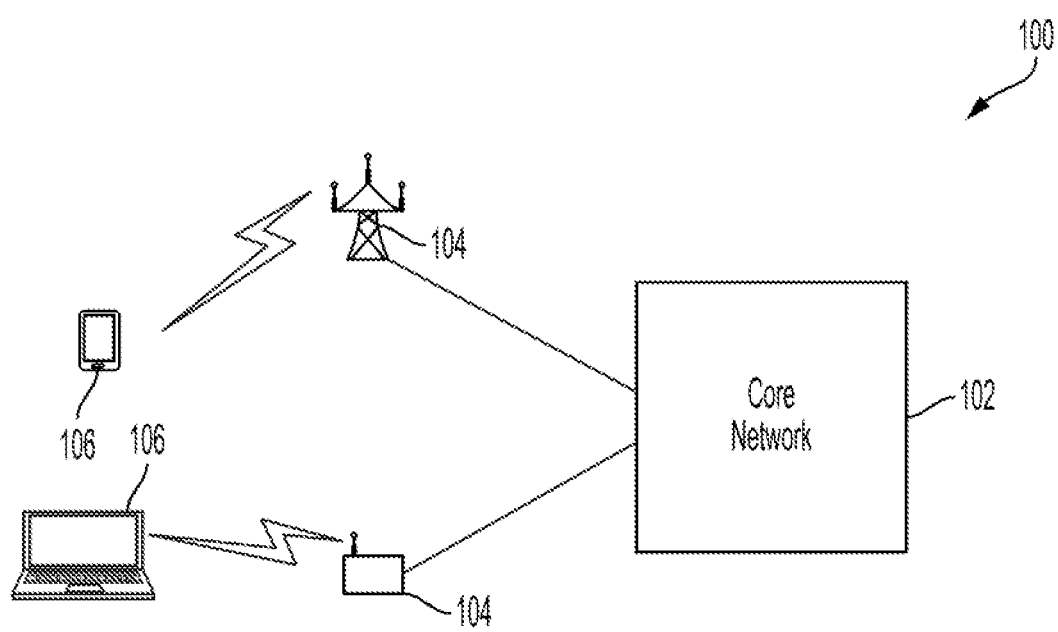
FIG. 1 illustrates an example network, according to an aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

OVERVIEW

As noted above, SRv6 requires mobile and network operators to implement a network monitoring mechanism to be used for applying network routing policies such as Ultra-Reliable Low-Latency Communication (URLLC). Herein, example embodiments of a packet tracing mechanism will be described that provides packet tracing information to a network controller to be used for improving application of network routing policies.

In one aspect, a network device includes memory having computer-readable instructions stored therein and one or more processors. The one or more processors are configured to execute the computer-readable instructions to receive a data packet sent from a source node to a destination node; determine if the data packet is to be updated with packet tracing information; and upon determining that the data packet is to be updated, update the packet tracing information of the data packet to include identification of the network device and an ingress timestamp of the data packet at the network device for a corresponding network controller to determining network routing policies.

In one aspect, one or more non-transitory computer-readable media includes computer-readable instructions, which when executed by one or more processors of a network router, cause the network router to receive a data packet sent from a source node to a destination node; determine if the data packet is to be updated with packet tracing information; and upon determining that the data packet is to be updated, update the packet tracing information of the data packet to include identification of the network device and an ingress timestamp of the data packet at the network router for a corresponding network controller to determining network routing policies.

In one aspect, a method includes receiving a data packet sent from a source node to a destination node; determining if the data packet is to be updated with packet tracing information; and upon determining that the data packet is to be updated, updating packet tracing information of the data packet to include identification of the network device and an ingress timestamp of the data packet at the network device for a corresponding network controller to determining network routing policies.

DETAILED DESCRIPTION

The disclosure begins with a description of various types of network in which examples of packet tracing mechanism of the present disclosure can be implemented. Such networks can include, but are not limited to, a network (an example of which will be described with reference to FIGS. 1 and 2) and an enterprise network (e.g., a 5G network, an example of which will be described with reference to FIG. 3).

FIG. 1 illustrates an example network, according to an aspect of the present disclosure. Network 100 is an example mobile network that may include a core network component 102, which may be an LTE or 5G core network, with an example 5G network being described below with reference to FIG. 2. In addition to core network 102, mobile network 100 also includes one or more base stations (e.g., a macro e-nodeB, micro base station for LTE or a gNode-B) or more or more routers (e.g., 5G enabled routers), depicted as access points 104 in FIG. 1. For purposes of the present disclosure, it is assumed that each of APs 110 can be a LTE and/or a 5G small cell transport router or AP. In one example, such APs 110 can have integrated Wi-Fi capabilities that support both cellular wireless connectivity and Wi-Fi connectivity to devices connected thereto. However, network 100 can also have Wi-Fi only APs. APs 110 can be any known or to be developed AP having LTE/5G and Wi-Fi integrated capabilities such as those designed and manufactured by Cisco Technology, Inc. of San Jose, Calif.

One or more endpoint devices such as devices 106, which may be any type of known or to be developed device (e.g., a mobile phone, a laptop, a tablet, an Internet of Things (IoT) device and/or any other device or equipment with cellular connectivity), may connect to mobile network 100 and communicate with other endpoint devices, servers, etc., via mobile network 100.

Figure 2:
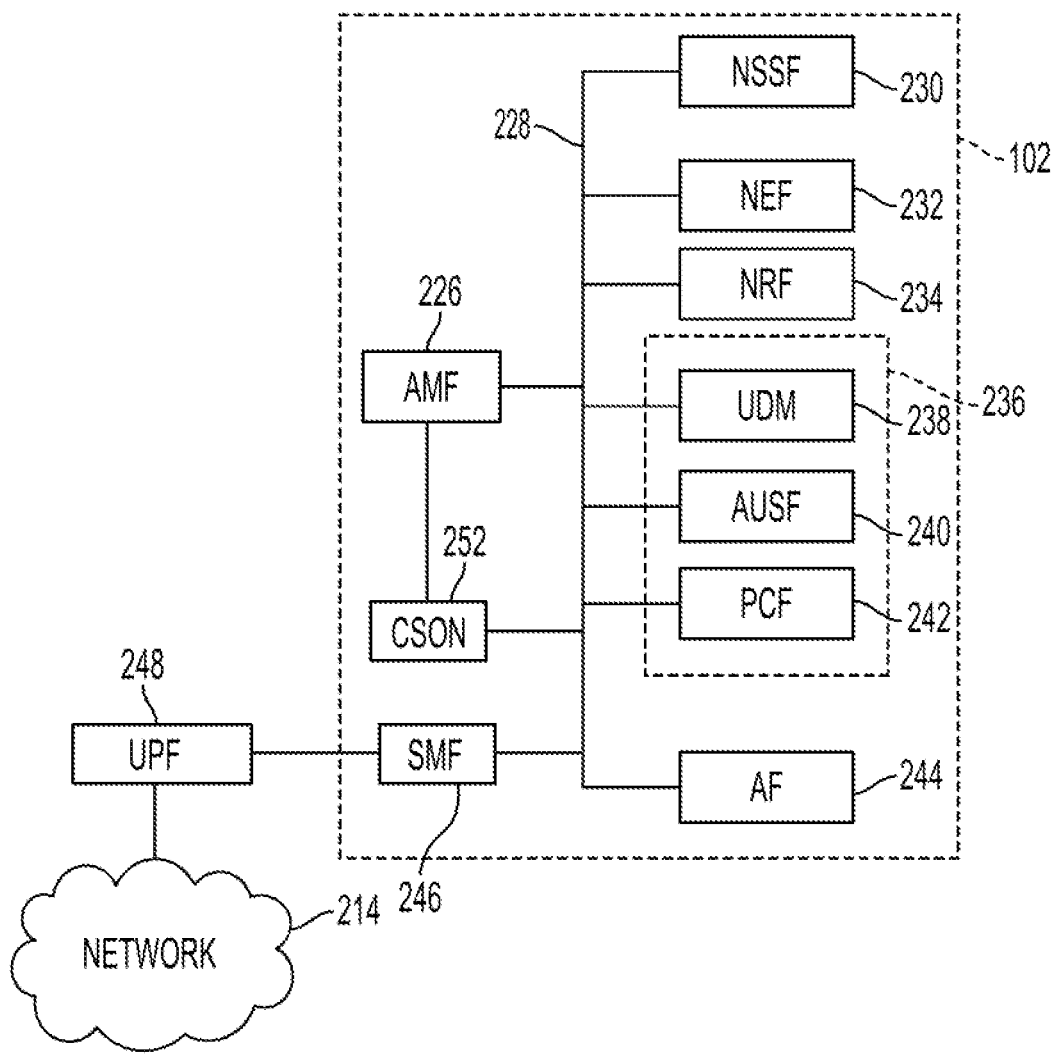
FIG. 2 illustrates an example of a 5G packet core of network of FIG. 1, according to an aspect of the present disclosure.

FIG. 2 illustrates an example of a 5G packet core of network of FIG. 1, according to an aspect of the present disclosure. While FIG. 2 illustrate a 5G packet core as an example packet core of network of FIG. 1, such packet core is not limited to 5G but can be a 4G, LTE packet core as well.

In example of FIG. 2, core network 102 is a 5G core network having logical components. Example components include various network functions implemented via one or more dedicated and/or distributed servers (can be cloud based). 5G core network 102 can be highly flexible, modular and scalable. It can include many functions including network slicing. It offers distributed cloud-based functionalities, Network functions virtualization (NFV) and Software Defined Networking (SDN).

For example and as shown in FIG. 2, core network 102 has Application and Mobility Management Function (AMF) 226 and bus 228 connecting various servers providing different example functionalities. For example, bus 228 can connect AMF 226 to Network Slice Selection Function (NSSF) 230, Network Exposure Function (NEF) 232, Network Repository Function (NRF) 234, Unified Data Control (UDC) 236, which itself can include example functions including Unified Data Management (UDM) 236, Authentication Server Function (AUSF) 240, Policy Control Function (PCF) 242, Application Function (AF) 244 and Session Management Function (SMF) 246. Various components of core network 102, examples of which are described above, provide known or to be developed functionalities for operation of 5G networks including, but not limited to, device registration, attachment and authentication, implementing network policies, billing policies, etc.

Furthermore, as shown in FIG. 2, SMF 246 is connected to User Plane Function (UPF) 248, which in turns connects core network 102 and one or more of devices 106 via network 214.

While FIG. 2 illustrates an example structure and components of core network 102, the present disclosure is not limited thereto. Core network 102 can include any other number of known or to be developed logical functions and components and/or can have other known or to be developed architecture.

Furthermore, core network 102 can have a centralized Self Organizing Network (CSON) function/server 252 connected to AMF 226. CSON server 252 can have a dedicated server for performing functionalities thereof (e.g., management of device registrations, load balancing, integrated access backhaul, etc.).

With a mobile network as one example of a network in which SRv6 based tracing mechanism of the present application can be applied, another example network will now be described with reference to FIG. 3.

Figure 3:
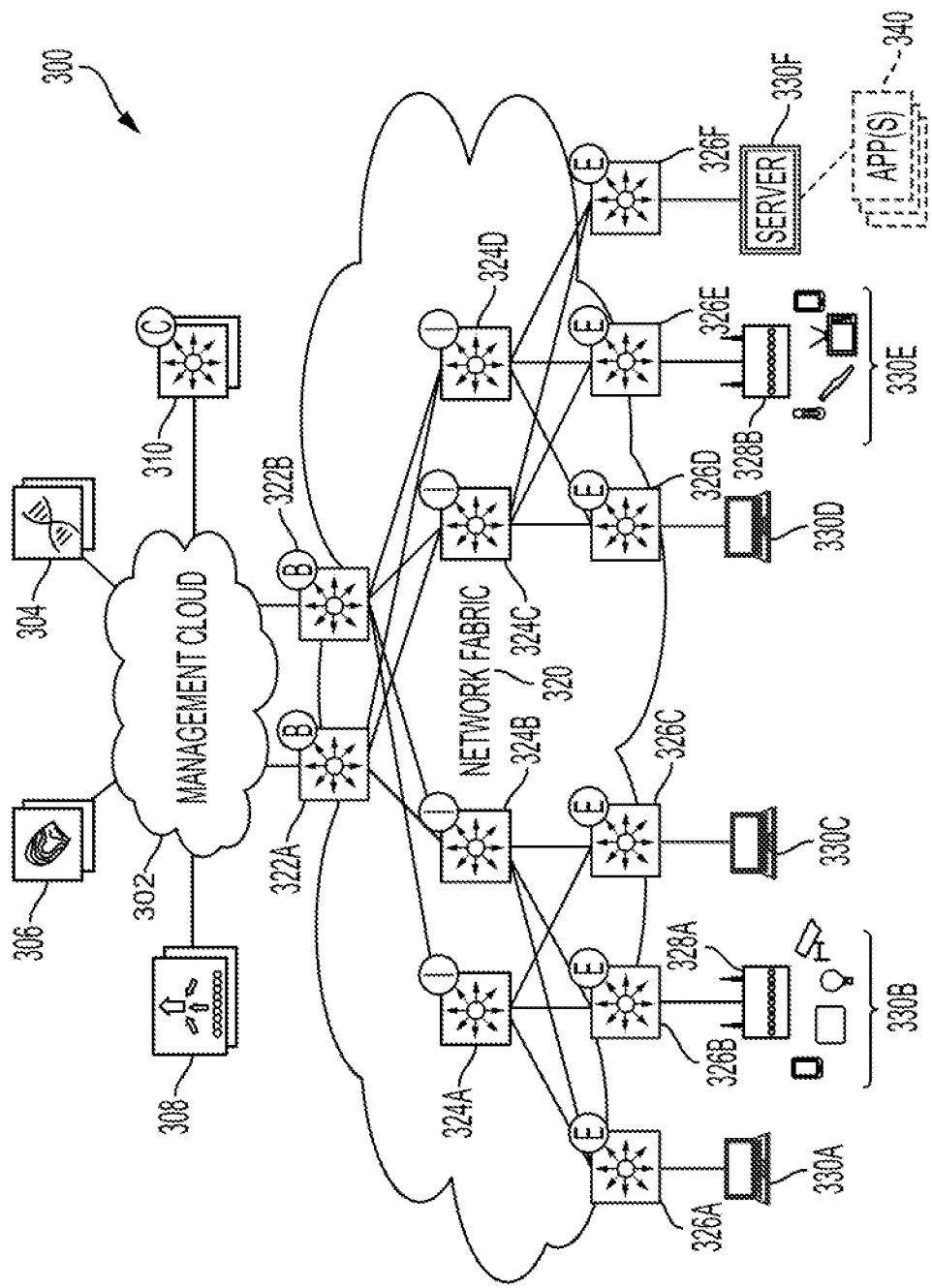
FIG. 3 illustrates an example of a physical topology of a standalone enterprise network in accordance with one aspect of the present disclosure.

FIG. 3 illustrates an example of a physical topology of an enterprise network in accordance with one aspect of the present disclosure. It should be understood that, for the enterprise network 300 and any network discussed herein, there can be additional or fewer nodes, devices, links, networks, or components in similar or alternative configurations. Example embodiments with different numbers and/or or types of endpoints, nodes, cloud components, servers, software components, devices, virtual or physical resources, configurations, topologies, services, appliances, or deployments are also contemplated herein. Further, the enterprise network 300 can include any number or type of resources, which can be accessed and utilized by endpoints or network devices. The illustrations and examples provided herein are for clarity and simplicity.

In this example, the enterprise network 300 includes a management cloud 302 and a network fabric 320. Although shown as an external network or cloud to the network fabric 320 in this example, the management cloud 302 may alternatively or additionally reside on the premises of an organization or in a colocation center (in addition to being hosted by a cloud provider or similar environment). The management cloud 302 can provide a central management plane for building and operating the network fabric 320. The management cloud 302 can be responsible for forwarding configuration and policy distribution, as well as device management and analytics. The management cloud 302 can comprise one or more network controller appliances 304, one or more authentication, authorization, and accounting (AAA) appliances 306, one or more wireless local area network controllers (WLCs) 308, and one or more fabric control plane nodes 310. In other example embodiments, one or more elements of the management cloud 302 may be co-located with the network fabric 320.

The network controller appliance(s) 304 can function as the command and control system for one or more network fabrics, and can house automated workflows for deploying and managing the network fabric(s). The network controller appliance(s) 304 can include automation, design, policy, provisioning, and assurance capabilities, among others, as discussed further below with respect to FIG. 2. In some example embodiments, one or more Cisco Digital Network Architecture (Cisco DNA™) appliances can operate as the network controller appliance(s) 304.

The AAA appliance(s) 306 can control access to computing resources, facilitate enforcement of network policies, audit usage, and provide information necessary to bill for services. The AAA appliance can interact with the network controller appliance(s) 304 and with databases and directories containing information for users, devices, things, policies, billing, and similar information to provide authentication, authorization, and accounting services. In some example embodiments, the AAA appliance(s) 306 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 306.

The WLC(s) 308 can support fabric-enabled access points attached to the network fabric 320, handling traditional tasks associated with a WLC as well as interactions with the fabric control plane for wireless endpoint registration and roaming. In some example embodiments, the network fabric 320 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 308.

The network fabric 320 can comprise fabric border nodes 322A and 322B (collectively, 322), fabric intermediate nodes 324A-D (collectively, 324), and fabric edge nodes 326A-F (collectively, 326). Although the fabric control plane node(s) 310 are shown to be external to the network fabric 320 in this example, in other example embodiments, the fabric control plane node(s) 310 may be co-located with the network fabric 320. In example embodiments where the fabric control plane node(s) 310 are co-located with the network fabric 320, the fabric control plane node(s) 310 may comprise a dedicated node or set of nodes or the functionality of the fabric control node(s) 310 may be implemented by the fabric border nodes 322.

The fabric control plane node(s) 310 can serve as a central database for tracking all users, devices, and things as they attach to the network fabric 320, and as they roam around. The fabric control plane node(s) 310 can allow network infrastructure (e.g., switches, routers, WLCs, etc.) to query the database to determine the locations of users, devices, and things attached to the fabric instead of using a flood and learn mechanism. In this manner, the fabric control plane node(s) 310 can operate as a single source of truth about where every endpoint attached to the network fabric 320 is located at any point in time. In addition to tracking specific endpoints (e.g., /32 address for IPv4, /428 address for IPv5, etc.), the fabric control plane node(s) 310 can also track larger summarized routers (e.g., IP/mask). This flexibility can help in summarization across fabric sites and improve overall scalability.

The fabric border nodes 322 can connect the network fabric 320 to traditional Layer 3 networks (e.g., non-fabric networks) or to different fabric sites. The fabric border nodes 322 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 322 can also exchange reachability and policy information with fabric control plane nodes of different fabric sites. The fabric border nodes 322 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 324 can operate as pure Layer 3 forwarders that connect the fabric border nodes 322 to the fabric edge nodes 326 and provide the Layer 3 underlay for fabric overlay traffic.

The fabric edge nodes 326 can connect endpoints to the network fabric 320 and can encapsulate/decapsulate and forward traffic from these endpoints to and from the network fabric. The fabric edge nodes 326 may operate at the perimeter of the network fabric 320 and can be the first points for attachment of users, devices, and things and the implementation of policy. In some example embodiments, the network fabric 320 can also include fabric extended nodes (not shown) for attaching downstream non-fabric Layer 2 network devices to the network fabric 320 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 326 for communication to outside subnets.

In some example embodiments, all subnets hosted in a fabric site can be provisioned across every fabric edge node 326 in that fabric site. For example, if the subnet 10.10.10.0/24 is provisioned in a given fabric site, this subnet may be defined across all of the fabric edge nodes 326 in that fabric site, and endpoints located in that subnet can be placed on any fabric edge node 326 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 322, 324, and 326.

The enterprise network 300 can also include wired endpoints/devices 330A, 330C, 330D, and 330F and wireless endpoints 330B and 330E (collectively, 330). The wired endpoints 330A, 330C, 330D, and 330F can connect by wire to fabric edge nodes 326A, 326C, 326D, and 326F, respectively, and the wireless endpoints 330B and 330E can connect wirelessly to wireless access points 328B and 328E (collectively, 328), respectively, which in turn can connect by wire to fabric edge nodes 326B and 326E, respectively. One or more of endpoints 330 can be a server such as server 330F running one or more applications 340 that can be accessed via other endpoint devices 330.

In some example embodiments, Cisco Aironet® access points, Cisco Meraki® MR access points, and/or other Cisco DNA™-ready access points can operate as the wireless access points 328.

The endpoints 330 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 330 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 320 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 308 notifying the fabric control plane node(s) 310 of joins, roams, and disconnects by the wireless endpoints 330 such that the fabric control plane node(s) can have connectivity information about both wired and wireless endpoints in the network fabric 320, and can serve as the single source of truth for endpoints connected to the network fabric. For data plane integration, the WLC(s) 308 can instruct the fabric wireless access points 328 to form a VXLAN overlay tunnel to their adjacent fabric edge nodes 326. The AP VXLAN tunnel can carry segmentation and policy information to and from the fabric edge nodes 326, allowing connectivity and functionality identical or similar to that of a wired endpoint. When the wireless endpoints 330 join the network fabric 320 via the fabric wireless access points 328, the WLC(s) 308 can onboard the endpoints into the network fabric 320 and inform the fabric control plane node(s) 310 of the endpoints' Media Access Control (MAC) addresses. The WLC(s) 308 can then instruct the fabric wireless access points 328 to form VXLAN overlay tunnels to the adjacent fabric edge nodes 326. Next, the wireless endpoints 330 can obtain IP addresses for themselves via Dynamic Host Configuration Protocol (DHCP). Once that completes, the fabric edge nodes 326 can register the IP addresses of the wireless endpoint 330 to the fabric control plane node(s) 310 to form a mapping between the endpoints' MAC and IP addresses, and traffic to and from the wireless endpoints 330 can begin to flow.

In example setting of FIG. 3, first mile connectivity or connection can be defined as the connection between any one of endpoint devices 330, the corresponding AP 328A or 328B and the corresponding WLC 326. The single point of failure problem mentioned above arises when either the AP to which an endpoint is connected fails or the WLC to which the AP or the endpoint is connected fails and currently, the amount of time it takes for a backup/remote WLC to take over the failed WLC or for the endpoint 330 to scan and find an alternative/neighboring AP takes a relatively long period of time that undermines deterministic service delivery.

FIGS. 4A-D describe examples of packet header formats according to one aspect of the present disclosure.

Figure 4A:
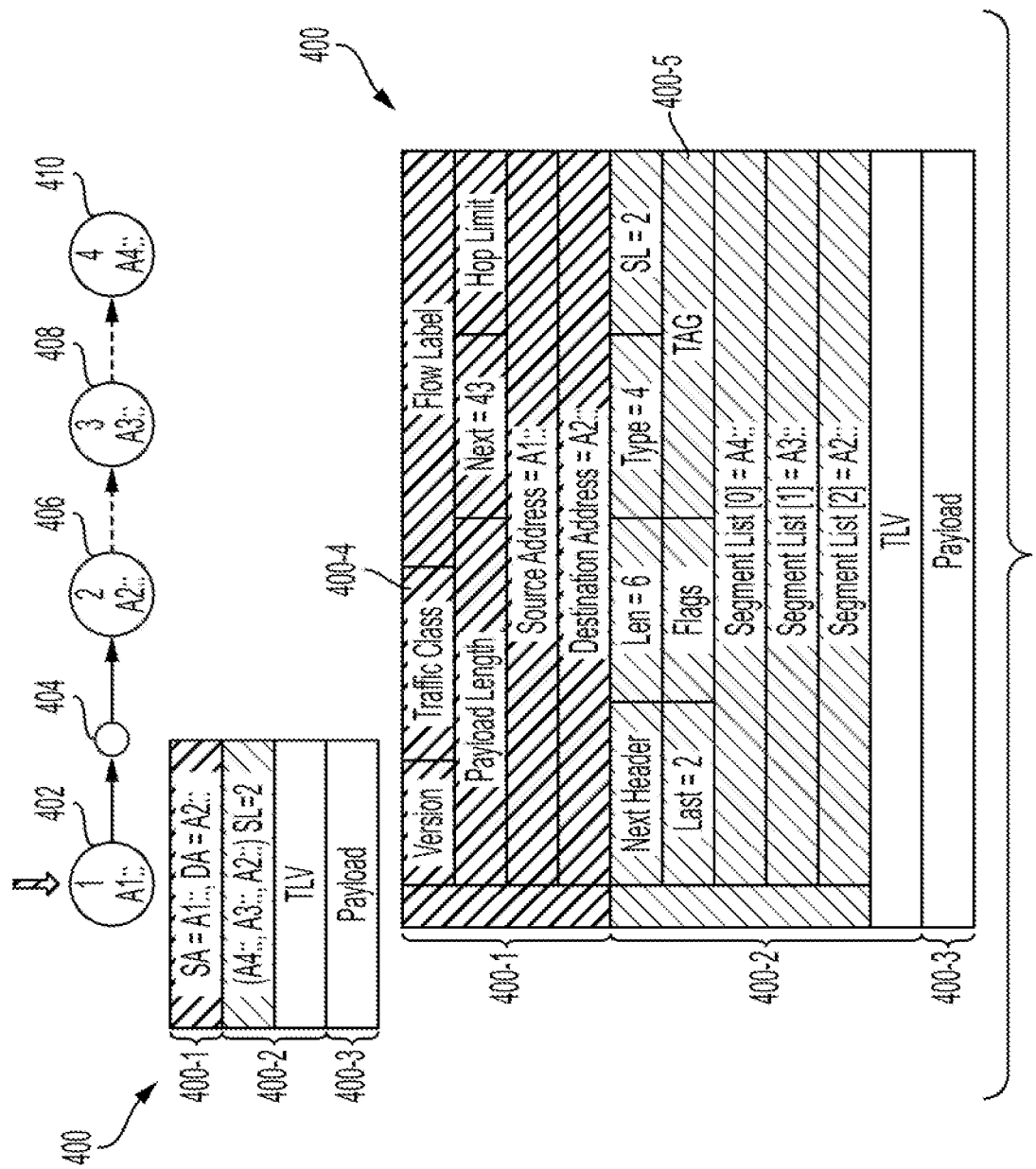
FIGS. 4A-D describe examples of packet header formats according to one aspect of the present disclosure.

As shown in FIG. 4A, a data packet 400 originating from node 1 (e.g., device 106 of FIG. 1) is to traverse through nodes 404, 406 and 408 of a network, such as any one of the networks described with reference to FIGS. 1-5 to reach destination node 410 (e.g., device 118 of FIG. 1 network based application server). It is assumed that from among nodes 402, 404, 406, 408 and 410, node 404 is not SR capable but the remaining nodes are. Accordingly, SR capable nodes 402, 406, 408 and 410 have addresses A1::, A2::, A3:: and A4::, respectively. Number of SR capable and SR-incapable nodes along the traversal path of packet 400 are not limited to that shown in FIG. 4 but may be more or less.

In one example, packet 400 may have an IPv6 header 400-1, SR header 400-2 and payload 400-3. FIG. 4 also illustrates packet 412 which is a blown up version of packet 400 to illustrates various information and fields included in IPv6 header 400-1 and SR header 400-2. In particular, IPv6 header 400-1 has a field 400-3, titled Traffic Class which can have, for example 8 bits. This Traffic Class field 400-4 will be referenced below in describing packet tracing mechanism. Furthermore, SR header 400-2 has a Tag field 400-5, which will also be referenced below in describing packet tracing mechanism.

In creating SR Header (SRH) 400-2 at node 402, a reversed order of path to be traversed by data packet 400 to reach node 410 is included. This reverse order lists the address A4:: of last/destination node 410 first, followed by address A3:: of intermediate node 408, followed by the address A2:: of the first intermediate node 404. Since node 404 is not SR capable, no address thereof is included in SRH 400-2. Furthermore, IP Destination Address (DA) is set to the next SR capable node 406 (i.e., A2::) in IPv6 header 400-1.

As will be described below, SR header 400-2 may have an additional field referred to as Type, Length, Value (TLV) field at the end to include information related to implementing packet tracing mechanism of the present disclosure, as will be described below.

Figure 4B:
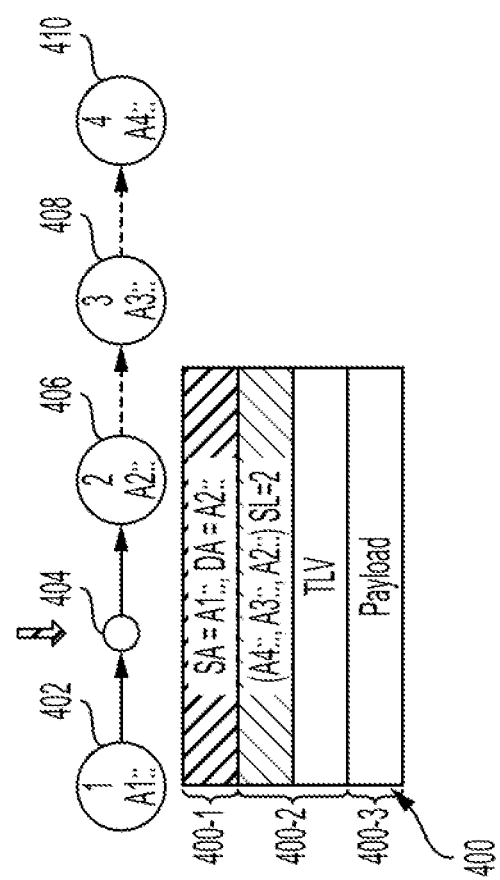

Next, packet 400 is forwarded to IP DA according to normal IPv6 forwarding mechanism. As shown in FIG. 4B, upon arriving at node 404, since node 404 is not SR capable, node 404 simply forwards data packet 400 to the next destination according to IPv6 forwarding and IPv6 DA without performing any SRH inspection or update.

Figure 4C:
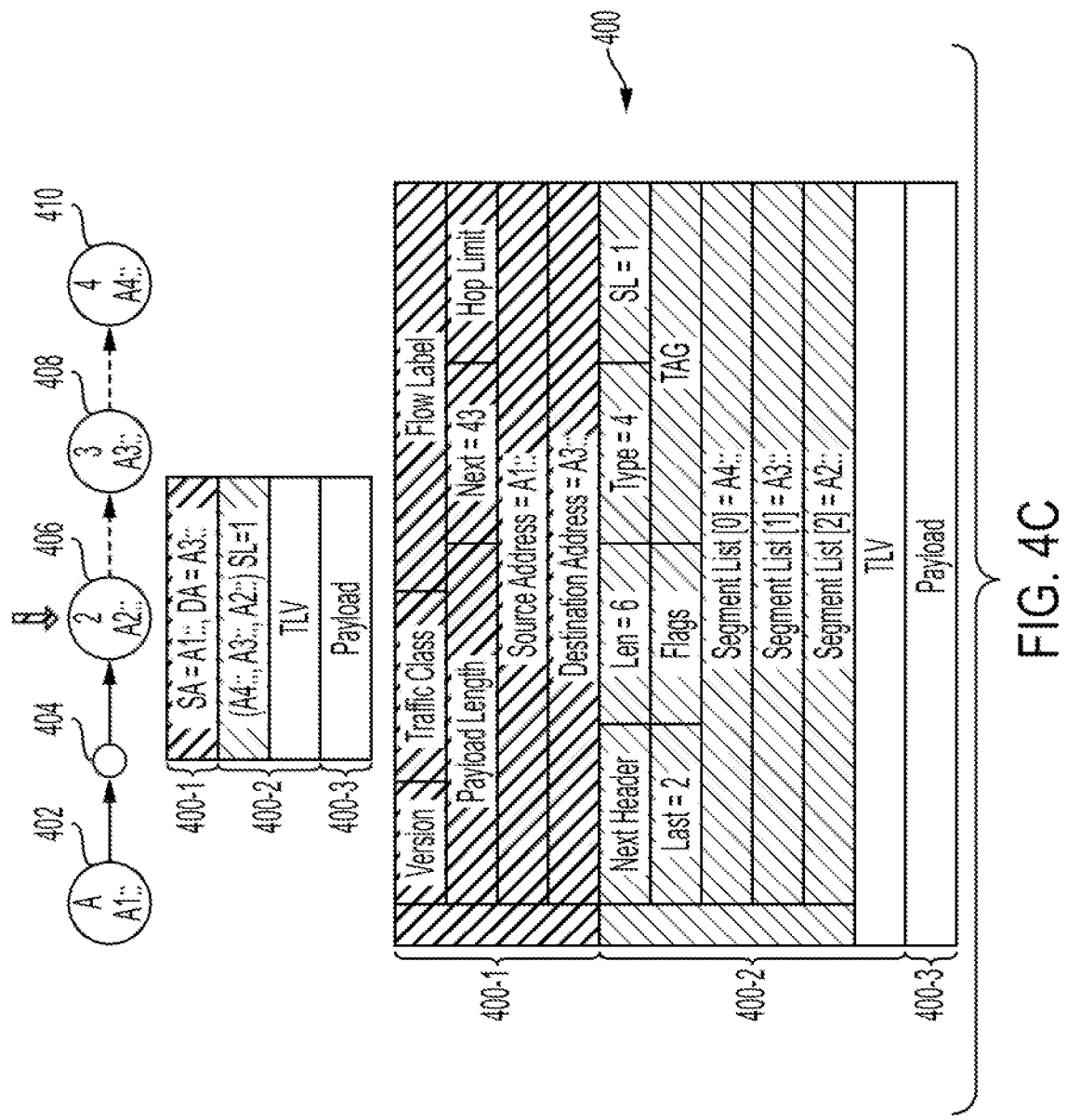

Next, packet 400 is forwarded to node 406. As shown in FIG. 4C, since node 406 is SR capable, node 406 inspects SRH 400-2 of packet 400 and if number of segments (nodes) left in the path are greater than zero, it decreases the number of segments left by 1, updates the DA according to the segment list (e.g., updates the DA to A3:: of node 408 according to the reverse list included in SRH header 400-2 and then forwards the packet according to the updated IPv6 DA, which is set to A3:: of node 408.

Next, packet 400 arrives at node 408 (which is SR capable) and the exact process as described above with reference to FIG. 4C is performed at node 408 and packet 400 is forwarded to destination node 410 according to updated IPv6 DA, which is set to A4:: of node 410.

Figure 4D:
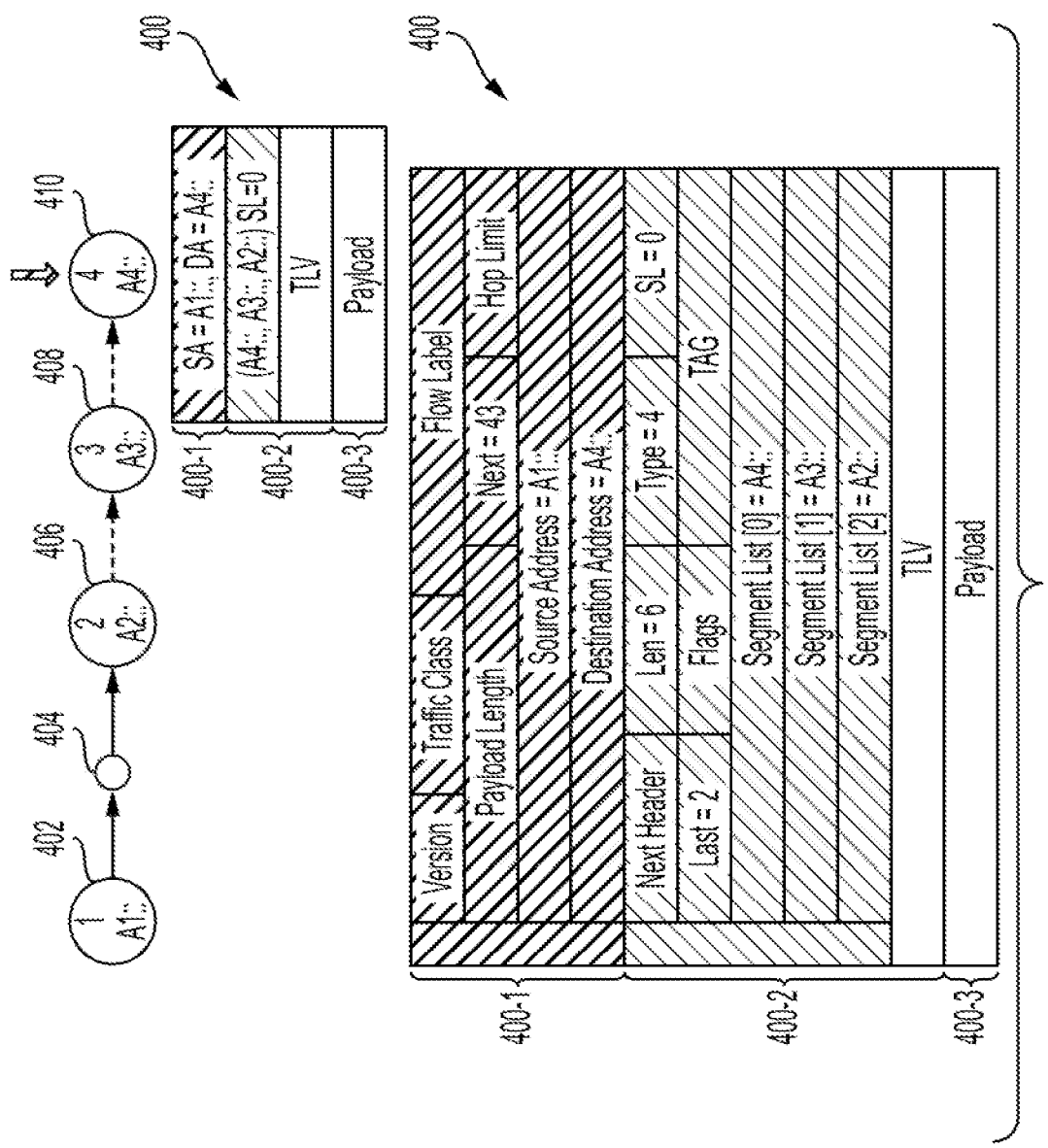

As shown in FIG. 4D, upon reaching destination node 410, node 410 again inspects the SRH 400-2 in a similar manner as nodes 406 and 408. In other words, node 410 inspects SRH 400-2 to determine if a number of segments left is greater than zero or not (if it is similar process as per FIG. 4B is performed). Since in this non-limiting example, node 410 is the last node, then number of segments left is equal to zero. Accordingly, node 410 removes IPv6 header 400-1 and SRH 400-2 and processes the payload according to any known or to be developed method.

With examples of segment routing headers and various types of networks in which segment routing may be implemented described with reference to FIGS. 1-4, the disclosure now turns to providing examples of modifications to segment routing headers for purposes of implementing packet tracing mechanism of the present disclosure.

Data packets communicated between two end devices such as devices 330A and device 330E of FIG. 3 or between device 330A and applications residing on network server 330F of FIG. 3, are typically encapsulated with appropriate routing headers at the originating node and then sent along a path according to the routing information such as the non-limiting address list of nodes described above with reference to FIGS. 4A-D and SR header 400-2.

Figure 5:
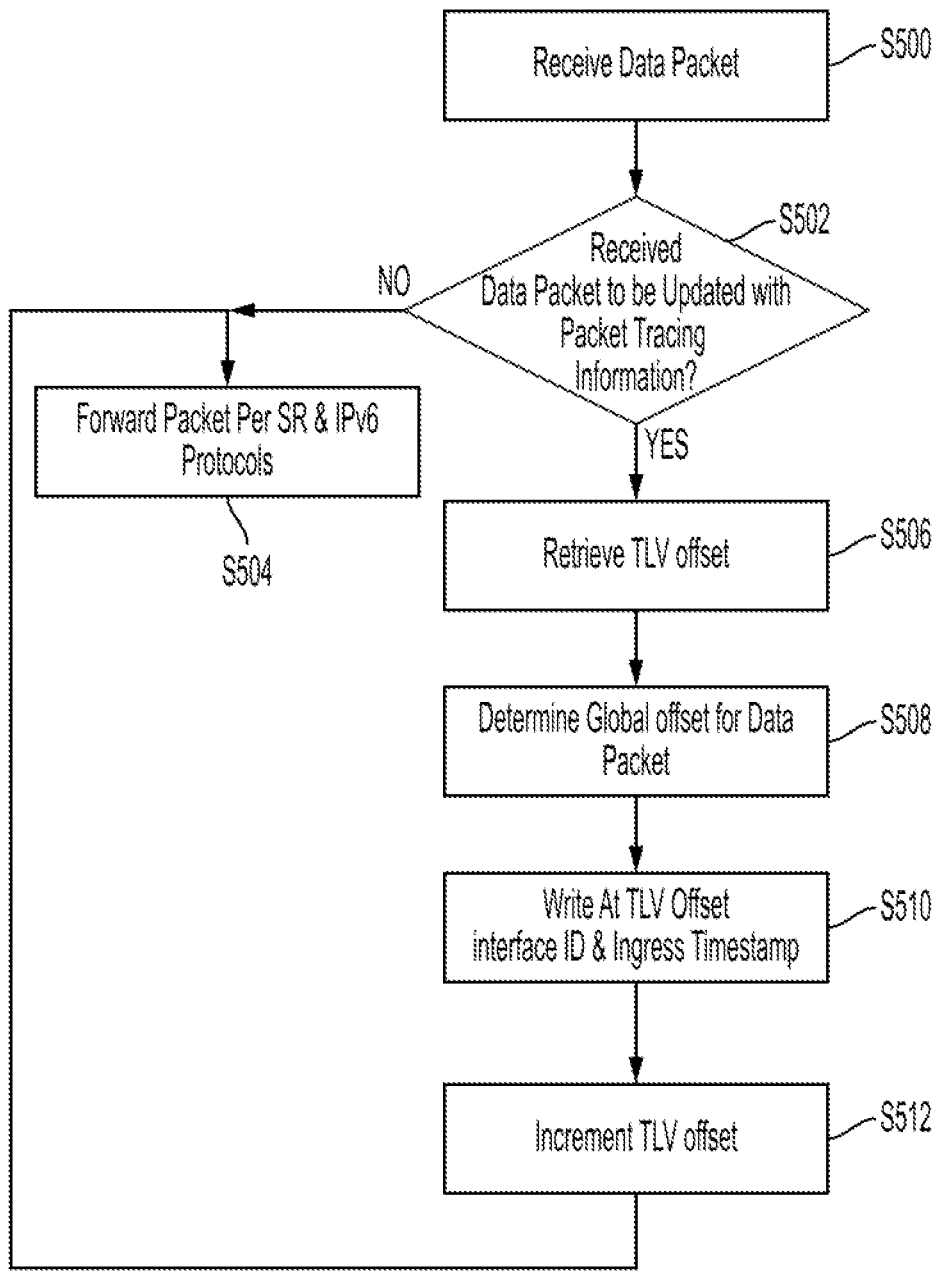
FIG. 5 describes an example of packet tracing mechanism, according to an aspect of the present disclosure.

FIG. 5 describes an example of packet tracing mechanism, according to an aspect of the present disclosure. It is assumed that, at the original node, each packet is encapsulated with SR header 400-2 as described above.

In one example embodiment, every threshold number of packets (e.g., every 1000 packets) is selected by the originating node and SR header 400-2 thereof is modified to include, in addition to segments and information shown in FIG. 4A, an empty Type, Length and Value (TLV) field (e.g., such field may be inserted between the last node address and payload 400-3).

In one example the size of the TLV field may be set based on a number of hops (nodes) along the path traversed by a data packet. For example, in FIG. 4, the number of hops is 4. Generally a conservative assumption is made that a number of hops for data packets is 9. Therefore, a size of the TLV field is set to 16 bits per hop (e.g., 16 b*9=18 bytes) and 16 bits per hop for writing timestamp information (e.g., 16 b*9=18 bytes) for a total of 36 bytes, in addition to 8 bytes for fixed SR header 400-2, and 2 bytes for TLV header.

Furthermore, for every packet with a large empty TLV field, the originating node may include a packet tracing bit (which can also be referred to as an OAM bit) in the packet's Traffic Class Field as described above.

In one example, a network controller may initially determine and set a particular path for data packets associated with a communication session between two end nodes in a network.

In describing example embodiments of packet tracing mechanism with respect to FIG. 5, it should be noted that every SR capable router and node along the path of a data packet is assigned an identifier (e.g., 16 bits) and a time-synching protocol with sub-milliseconds accuracy. The assigned ID need not be unique within the underlying network so long as the sequence of IDs of routers traversed by the packet can sufficiently and deterministically convey the traversed path.

After encapsulation, each packet initiates passage through the underlying network. The following series of steps may be performed by each router in the data packets path.

At S500, the receiving router (e.g., any one of the routers described above with reference to FIGS. 1-4), receives a data packet. At S502, the receiving router examines Traffic Class 400-4 of the IPv6 header 400-1 of the received packet to determine if the packet tracing bit included therein is set (e.g., set to 1). In other words, the receiving router determines if the received data packet is to be updated with in-band OAM information. If not, at S504, the packet is examined and forwarded per existing SR and IPv6 network protocols to the next node, as described above with reference to FIGS. 4A-D. If the packet tracing bit is set (e.g., set to 1), then the receiving node, at S506 inspects the SR header 400-2 and retrieves a TLV offset value "T" from Tag field 400-5 described above.

Traffic Class field 400-4 may have 8 bits, as mentioned above, which may be referred to as Differentiated Service Code Points (DSCP). One of the DSCP bits may be used at the packet tracing bit.

At S508, the receiving router determines a global offset value "O" as a sum of a current packet offset (value indicative of beginning of SR header 400-2 in the received packet), length of the fixed SR header 400-2 fields (e.g., 64), last entry value of SR header 400-2 "LE" multiplied by 128, length of the fixed TLV field (e.g., 16) and T retrieved at S504. The global offset "O" may be represented by equation (1) shown below:

$$O = C + 64 + LE*128 + 16 + T \qquad (1)$$

At S510, receiving router writes at position "O" in the TLV field, the interface ID of the receiving router (assigned to each router by a network controller, examples of which are described above with reference to FIGS. 1-4) and/or a current ingress timestamp. In one example each of the interface ID and the ingress timestamp may be 16 bits. In one example, interface ID and the timestamp may each be 12 bits. In another example, interface ID may be 12 bits and the time stamp may be 16 bits and therefore, interface ID may be padded to reach 16 bits. The information written to the TLV field at S510 may also be referred to as packet tracing information (OAM information). In another example, in addition to the interface ID and the ingress timestamp, duration of time that the data packet is at the receiving router may also be written at the position "O" in the TLV field.

In one example, the data packet may take less than one second to traverse its path to a destination and thus 12 to 16 bits is sufficient for capturing precise fraction of the one second that the data packet spends at the receiving router. 12 bits generally provides a precision of 244 micro seconds, while 16 bits generally provides a precision of 15 to 25 micro seconds.

Thereafter, at S512, the receiving router increments the TLV offset "T" in Tag field (e.g., by 32 bits) and the process reverts back to S504 where the packet is examined and forwarded per existing SR and IPv6 network protocols to the next node, as described above with reference to FIGS. 4A-D. In one example, the receiving router increments the TLV offset in the Tag field by a total of number bytes corresponding to the interface identifier, the ingress timestamp and/or the duration of time that the data packet is at the receiving router may also be written at the position "O" in the TLV field.

Processes of S506 to S512 may be referred to as a process for updating in-band packet tracing information of a data packet to include identification of the receiving router and ingress timestamp of the packet, which can then be used by a corresponding network controller to determine network routing policies. In one example, in addition to the ingress timestamp of the packet, duration of time of the data packet remaining at the receiving router, may also be included as part of the packet tracing information.

The process of FIG. 5 may be repeated by every router along the traversal path of a data packet from source to destination. This packet tracing information may then be sent to a network controller (e.g., UPFs of a mobile network, network controller appliance of an enterprise network, etc., examples of which are described above with reference to FIGS. 1-5).

In one example, packet tracing information may be processed by the network controller to give the network controller a better picture of the path and the corresponding time taken by data packets from a particular source to a particular destination. In one example, the network controller may correlate the packet tracing information with controller computed information to determine low-latency paths in the network, or to ensure that a particular path has been taken by data packets exchanged between two network nodes. Based on this analysis, the network controller can optimize data packet routing in the network (e.g., select paths with less jitter, less processing time, etc.).

In one example embodiment, packet tracing information may be provided to the network controller by the last receiving router that performs the process of FIG. 5.

In another example embodiment, instead of a network controller, the last receiving node may process the packet tracing information to determine a better picture of the path and the corresponding time taken by data packets from a particular source to a particular destination. Based on this analysis, the network controller can optimize data packet routing in the network (e.g., select paths with less jitter, less processing time, etc.).

Having described various examples of networks and packet tracing mechanism with reference to FIGS. 1-5, the disclosure now turns to describing example embodiments of devices and system components that can be utilized to implement routers, nodes and controllers of networks described above.

Figure 6A:
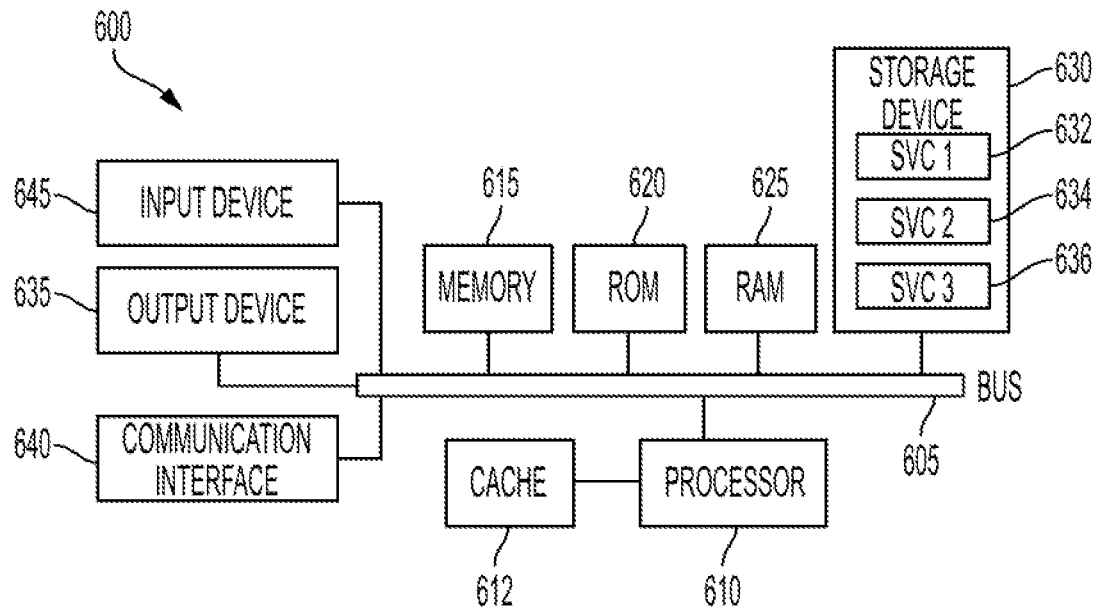
FIGS. 6A and 6B illustrate examples of systems in accordance with one aspect of the present disclosure.
Figure 6B:
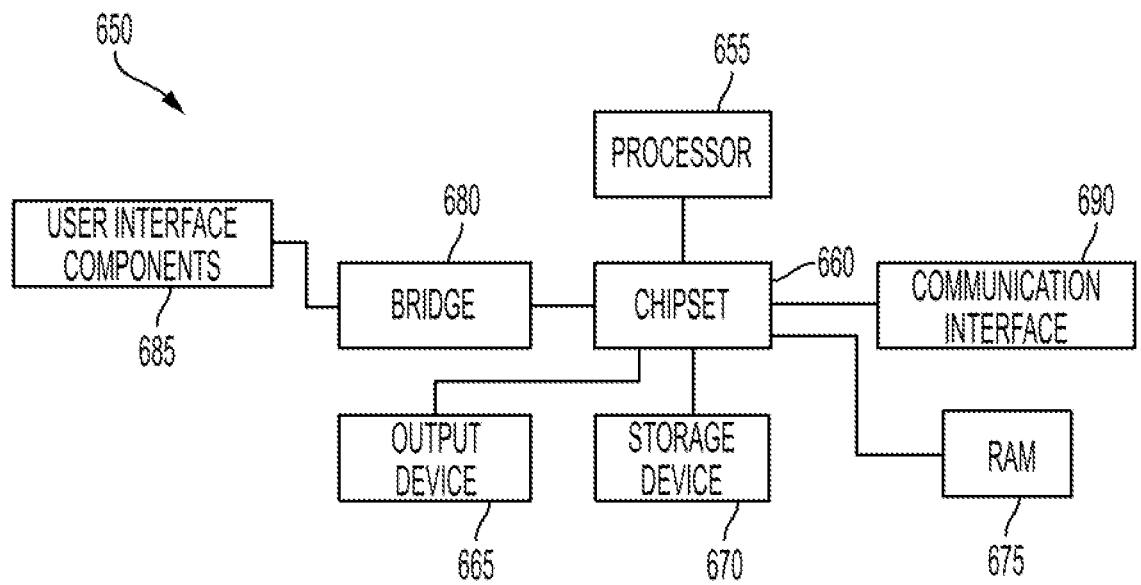

FIGS. 6A and 6B illustrate examples of systems in accordance with one aspect of the present disclosure.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module (service), such as service (SVC) 1 632, service (SVC) 2 634, and service (SVC) 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules/services SVC 632, SVC 634, SVC 635 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 650 that can control input to and output from the processor 655. In this example, the chipset 650 can output information to an output device 665, such as a display, and can read and write information to storage device 670, which can include magnetic media, solid state media, and other suitable storage media. The chipset 650 can also read data from and write data to RAM 675. A bridge 680 for interfacing with a variety of user interface components 685 can be provided for interfacing with the chipset 650. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 650 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In another embodiment, instead of using a map-in-map view, the map can be initially zoomed into one primary cluster of interest (e.g. the most important one based on some criteria), while a printed list of the other primary clusters is shown next to the map. This list can be ranked by each cluster's importance, such as by number of sites in each cluster or average health score of each cluster.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A network device for tracing data packets, the network device comprising:
   at least one processor; and
   at least one memory storing instructions which when executed by the at least one processor, causes the at least one processor to:
   receive a data packet sent from a source node to a destination node;
   determine if the data packet is to be updated with packet tracing information; and
   upon determining that the data packet is to be updated, update the data packet to include an identifier of the network device, an ingress timestamp of the data packet at the network device, and a type, length and value (TLV) field of the data packet based on the packet tracing information for a corresponding network controller to determine network routing policies,
   wherein the network device is at least one device on a path between the source node and destination node and is configured to transmit the data packet at least a portion of the path between the source node and the destination node.

2. The network device of claim 1, wherein the determining if the data packet is to be updated with packet tracing information is based on inspecting a header of the data packet to determine a number of subsequent nodes up to the destination node.

3. The network device of claim 1, further comprising instructions, which when executed by the at least one processor, causes the at least one processor to include a packet tracing bit in a traffic class field within a header of the data packet.

4. The network device of claim 1, wherein the packet tracing information to update the type, length and value field of the data packet includes a packet tracing bit.

5. The network device of claim 1, further comprising instructions, which when executed by the at least one processor, causes the at least one processor to update the packet tracing information to include a length of time of the data packet remaining at the network device.

6. The network device of claim 1, further comprising instructions, which when executed by the at least one processor, causes the at least one processor to:
determine a global offset value based on a sum of a current packet offset of the data packet, a length of fields within a header of the data packet, last entry of the header of the data packet, a length of the type, length and value field of the data packet, and an existing packet offset of the data packet; and
write the identifier of the network device and the ingress timestamp of the data packet at a position in the type, length and value filed that corresponds to the global offset value.

7. The network device of claim 6, further comprising instructions, which when executed by the at least one processor, causes the at least one processor to increment a value of the type, length and value field within a header of the data packet by a total number of bytes corresponding to the identifier of the network device and the ingress timestamp.

8. The network device of claim 1, wherein a size of the type, length and value field of the data packet at the source node is based on a number of nodes along a path from the source node to the destination node.

9. A method of tracing data packets, the method comprising:
receiving, at a network device, a data packet sent from a source node to a destination node;
determining if the data packet is to be updated with packet tracing information; and
upon determining that the data packet is to be updated, updating the data packet to include an identifier of the network device, an ingress timestamp of the data packet at the network device, and a type, length and value (TLV) field of the data packet based on the packet tracing information for a corresponding network controller to determine network routing policies,
wherein the network device is at least one device on a path between the source node and destination node and is configured to transmit the data packet at least a portion of the path between the source node and the destination node.

10. The method of claim 9, wherein the determining if the data packet is to be updated with packet tracing information is based on inspecting a header of the data packet to determine a number of subsequent nodes up to the destination node.

11. The method of claim 9, further comprising including a packet tracing bit in a traffic class field within a header of the data packet.

12. The method of claim 9, wherein the packet tracing information to update the type, length and value field of the data packet includes a packet tracing bit.

13. The method of claim 9, further comprising updating the packet tracing information to include a length of time of the data packet remaining at the network device.

14. The method of claim 9, wherein the updating the type, length and value field of the data packet based on the packet tracing information includes:
determining a global offset value based on a sum of a current packet offset of the data packet, a length of fields within a header of the data packet, last entry of the header of the data packet, a length of the type, length and value field of the data packet, and an existing packet offset of the data packet; and
writing the identifier of the network device and the ingress timestamp of the data packet at a position in the type, length and value filed that corresponds to the global offset value.

15. The method of claim 14, further comprising incrementing a value of the type, length and value field within a header of the data packet by a total number of bytes corresponding to the identifier of the network device and the ingress timestamp.

16. The method of claim 9, wherein a size of the type, length and value field of the data packet at the source node is based on a number of nodes along a path from the source node to the destination node.

17. One or more non-transitory computer-readable media comprising computer-readable instructions, which when executed by one or more processors of a network router, cause the network router to:
receive a data packet sent from a source node to a destination node;
determine if the data packet is to be updated with packet tracing information; and
upon determining that the data packet is to be updated, update the data packet to include an identifier of the network router, an ingress timestamp of the data packet at the network router, and a type, length and value (TLV) field of the data packet based on the packet tracing information for a corresponding network controller to determine network routing policies,
wherein the network device is at least one device on a path between the source node and destination node and is configured to transmit the data packet at least a portion of the path between the source node and the destination node.

18. The one or more non-transitory computer-readable media of claim 17, wherein the determining if the data packet is to be updated with packet tracing information is based on inspecting a header of the data packet to determine a number of subsequent nodes up to the destination node.

19. The one or more non-transitory computer-readable media of claim 17, updating the packet tracing information to include a length of time of the data packet remaining at the network router.

20. The one or more non-transitory computer-readable media of claim 17, wherein the updating the type, length and value field of the data packet based on the packet tracing information includes:
determining a global offset value based on a sum of a current packet offset of the data packet, a length of fields within a header of the data packet, last entry of the header of the data packet, a length of the type, length and value field of the data packet, and an existing packet offset of the data packet;
writing the identifier of the network router and the ingress timestamp of the data packet at a position in the type, length and value filed that corresponds to the global offset value; and
incrementing a value of the type, length and value field within a header of the data packet by a total number of bytes corresponding to the identifier of the network router and the ingress timestamp.

* * * * *